Figure 1:
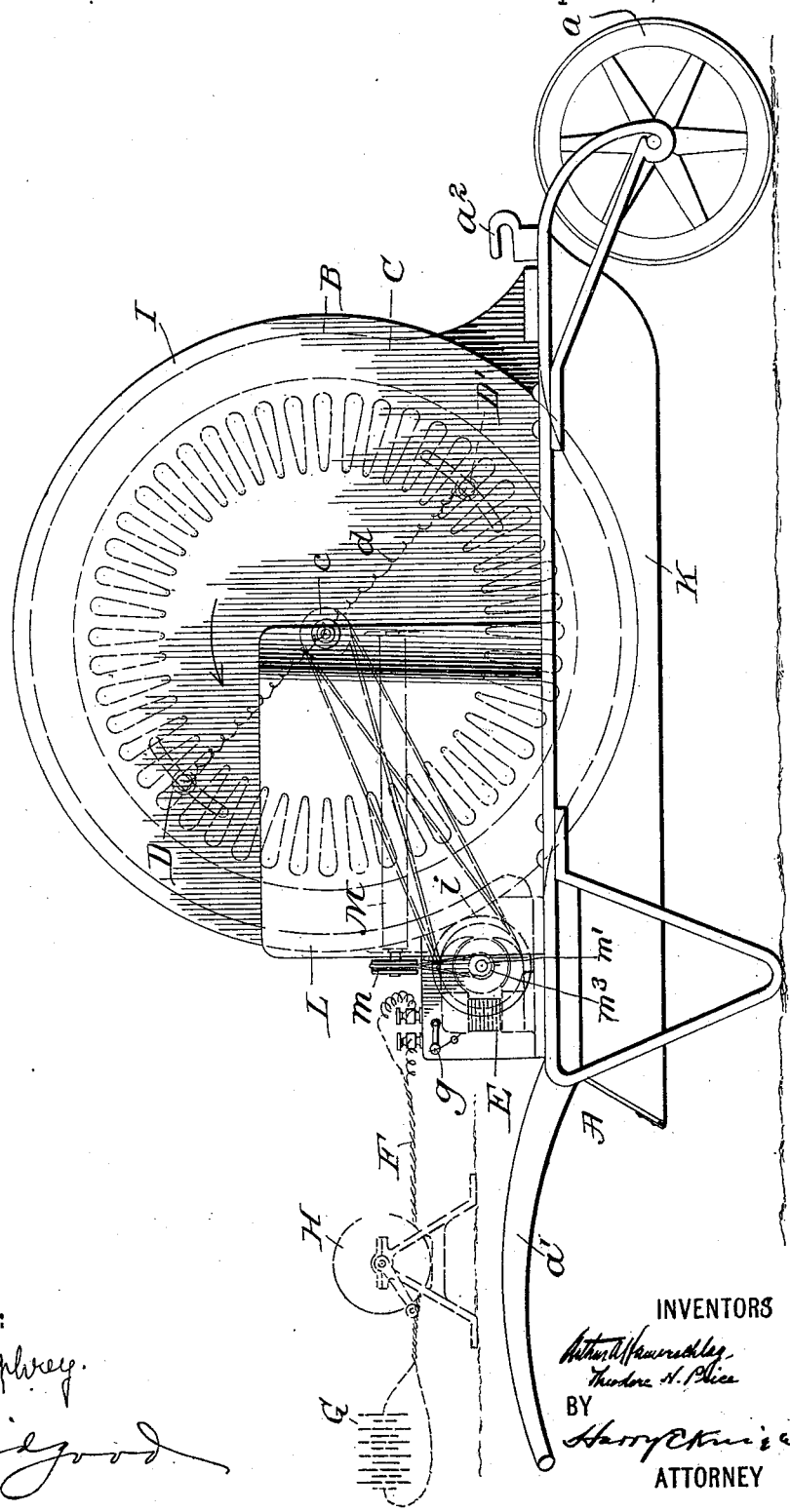

(No Model.) 4 Sheets—Sheet 2.
A. A. HAMERSCHLAG & T. H. PRICE.
COTTON PICKING MACHINE.
No. 602,076. Patented Apr. 12, 1898.

WITNESSES:
INVENTORS
BY
ATTORNEY (No Model.) 4 Sheets—Sheet 3.

A. A. HAMERSCHLAG & T. H. PRICE.
COTTON PICKING MACHINE.

No. 602,076. Patented Apr. 12, 1898.

WITNESSES:

INVENTORS
Arthur A Hamerschlag
Theodore H. Price
BY
Harry E Knight
ATTORNEY

THE NORRIS PETERS CO., PHOTO-LITHO., WASHINGTON, D. C.

(No Model.) 4 Sheets—Sheet 4.

A. A. HAMERSCHLAG & T. H. PRICE.
COTTON PICKING MACHINE.

No. 602,076. Patented Apr. 12, 1898.

WITNESSES:

INVENTORS

BY

ATTORNEY

UNITED STATES PATENT OFFICE.

ARTHUR A. HAMERSCHLAG AND THEODORE H. PRICE, OF NEW YORK, N. Y.

COTTON-PICKING MACHINE.

SPECIFICATION forming part of Letters Patent No. 602,076, dated April 12, 1898.

Application filed April 12, 1897. Serial No. 631,740. (No model.)

*To all whom it may concern:*

Be it known that we, ARTHUR A. HAMERSCHLAG and THEODORE H. PRICE, citizens of the United States, residing in the city, county, and State of New York, have invented certain new and useful Improvements in Cotton-Picking Machines, of which the following is a specification.

This invention relates to improvements in cotton-picking machines; and its object is to enable the picking and collecting of cotton to be effected in a rapid and satisfactory manner. Machines for this purpose have generally been open to the objection that they gathered leaves and unripe cotton along with the ripe cotton. In such machines this has been largely obviated by shaking or knocking the plants and collecting what is thus detached by suitable means, generally pneumatic suction devices.

Our invention dispenses with any necessity for knocking the plant, while attaining the result of only collecting what is readily detached—that is, ripe cotton—by the use of an electrified collector charged by an independent source of high-tension electricity. This collector in order to properly collect the cotton and deliver it to a suitable receptacle is made to move or rotate and is charged by induction or conduction, or both, from an electrical generator. The electrical charge required being of very high tension, we prefer to use for an electrical generator an electrostatic generator of the influence type, such as the Holz or Wimshurst machine. Such a machine is far more efficient than electrostatic generators of the frictional type and can be made to maintain a charge under much less favorable atmospheric conditions. The speed of rotation of the influence-machine is necessarily rather high, while that of the collector is necessarily comparatively low, which is one reason why the collector is made independent of the generator. By thus making these two essential parts independent we are also enabled to inclose the generator in a closed casing, which not only protects it from contact with outer objects, which is important on account of its very high speed, but enables it to develop the charge more rapidly and efficiently by providing an artificially-dried atmosphere, this being secured by putting in said casing any suitable desiccating agent, such as sulfuric acid or calcium chlorid in an open vessel.

A further feature of our invention relates to the location of the receptacle for the cotton beneath the collector and below the usual level of the cotton-bolls on the plant, so that as the cotton falls either from the plant or from the collector its tendency is generally to fall into the receptacle.

Another feature of our invention relates to means for driving the generator and collector independently of the motion of the frame or truck carrying same and to other features hereinafter set forth and claimed.

Figure 2:
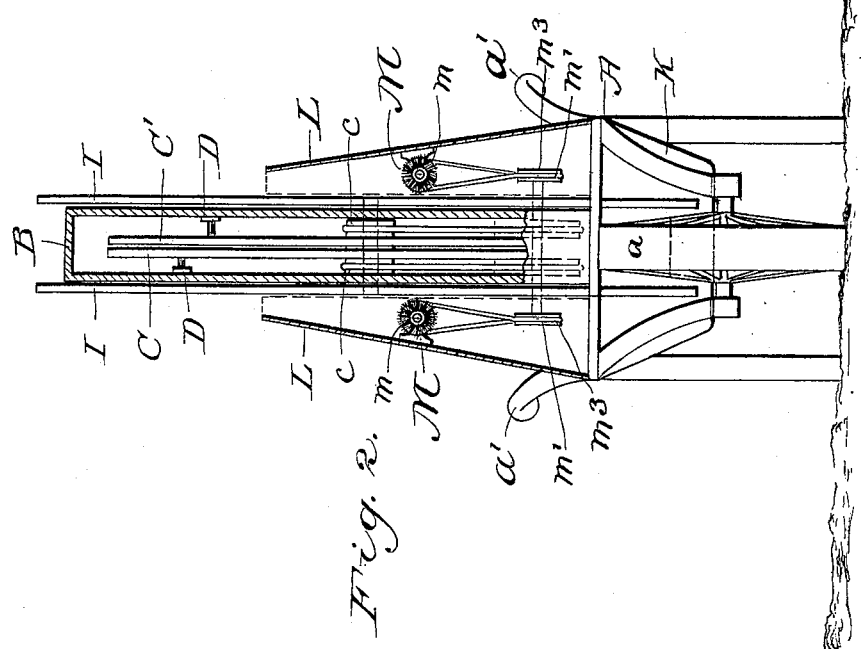
Figure 3:
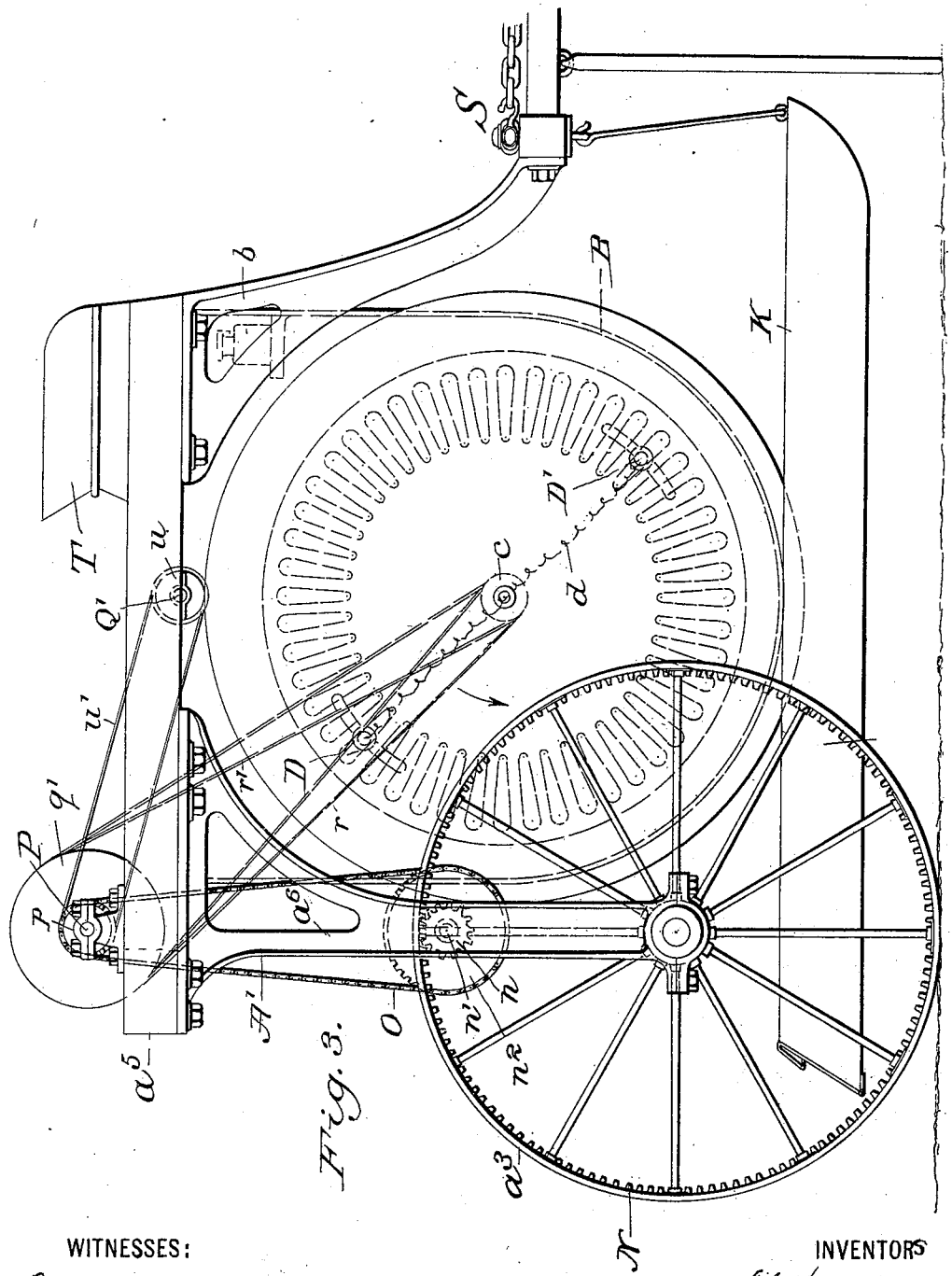
Figure 4:
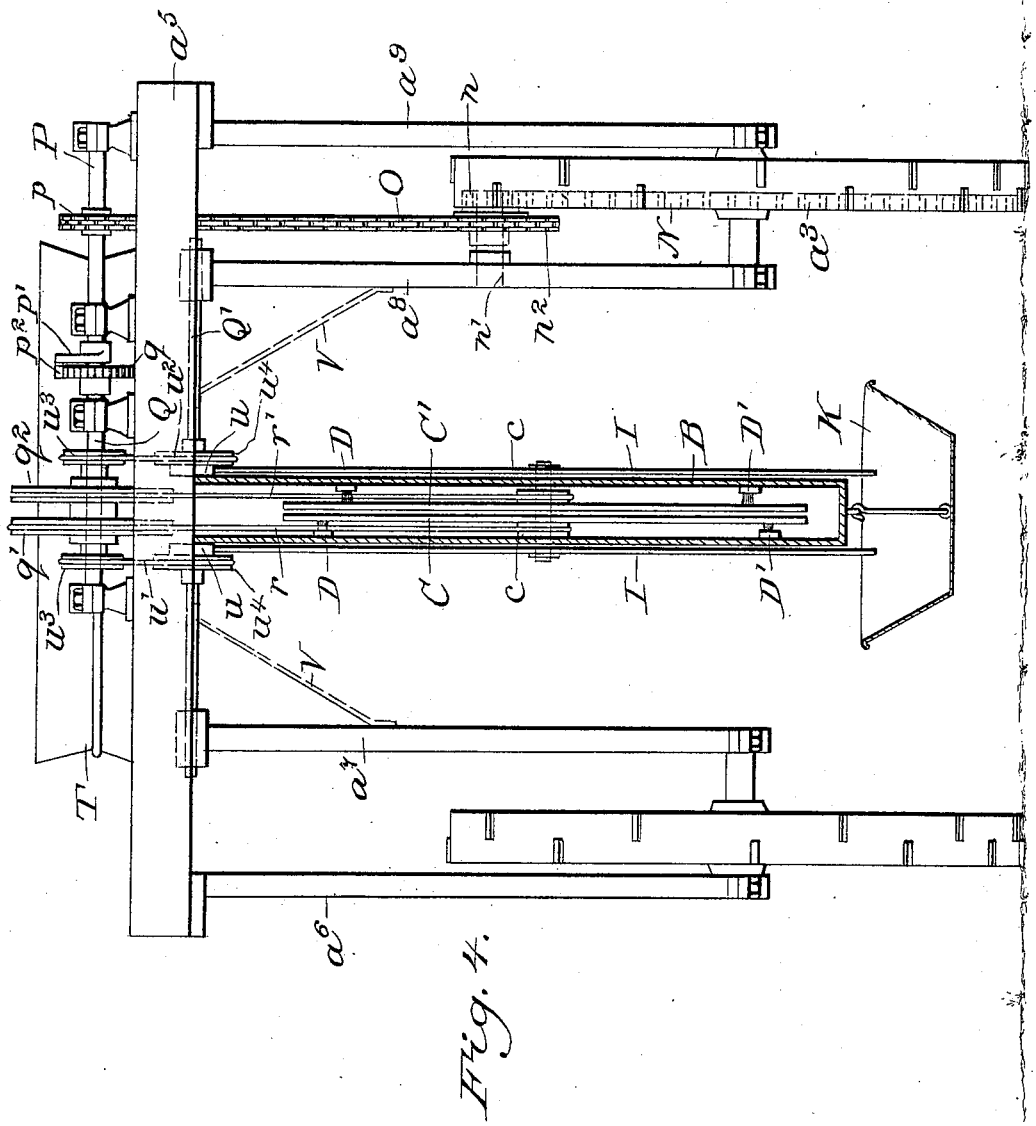

In the accompanying drawings, which form a part of this specification, Figure 1 is a side elevation of a machine embodying our invention, the same being supported on or carried by a hand-truck and the motion of the generator and collector being imparted by a motor operating independently of the motion of the truck. Fig. 2 is an end view of the form shown in Fig. 1, part thereof being shown in section. Figs. 3 and 4 are respectively side and end elevations of a modified form of the machine.

In Fig. 1, A is a suitable hand-truck frame mounted on wheel $a$ and having handles $a'$, whereby it may be conveniently propelled. Means, such as hook or clevis $a^2$, may also be provided at the front end of the frame to enable attachment of a horse thereto to aid in the propulsion thereof.

The frame A carries a box or casing B, preferably substantially air-tight, which serves to support and inclose an electrical generator consisting of two insulating-disks C C', having thereon the usual inducing-sections of an influence-machine. A pair of brushes or combs D D' is provided for each disk C C', and said pairs are connected by a diagonal conductor $d$, as shown in dotted lines. The disks C C' are rotated in opposite directions by means of pulleys $c\ c'$, attached thereto and belted to a motor E. The influence-machine described and shown is of a well-known and very efficient type and is particularly applicable to the present use, especially when the number of sections is made very large. We have found that by sufficiently increasing the number of these sections an effective charge may be produced and maintained under very unfavorable atmospheric conditions. An open vessel or bottle $b$, placed in the casing B, maintains the air therein in a dry condition, and this enables the generator to more readily reach and maintain the desired tension.

The motor E for driving the generator is preferably an electric motor, as shown, and is supplied with operating-current by a double cable F, connected thereto and to a storage battery, dynamo, or other generator G, located at any desired point, a switch $g$ being included in the circuit. To pay out the cable or take it up, as required, a suitable winding-drum H may be provided.

I is the collector, which is shown in the form of a disk rotated by connection with the motor E, the motor driving a friction-roll $i$, bearing on the periphery of disk I. The motion of the collector-disk must necessarily be rather slow to properly take up and deposit the cotton, while the motion of the influence-machine disks C C′ is necessarily very rapid to produce the required tension of electrification, and the ratio of sizes of the driving and driven wheels is such as to obtain this difference of speed. There may be, if desired, collector-disks I on each side of the box B, as shown, driven in the same direction and both charged from the same generator C C′.

The receptacle or basket K for the cotton is placed beneath the collector or collectors I and is wide enough to almost span the space between the rows of plants and, in fact, is preferably wide enough to extend under the cotton-plants somewhat, so as to insure the reception therein of freely-falling cotton as far as possible.

A guard L is placed at the rear end of the collector-disk I, the same extending upward from the edge of the basket K, and a doffer brush-cylinder M may also be placed under said guard and be rotated at a comparatively high rate of speed by connection to motor E, as shown, through pulleys $m$ $m'$ and belt $m^3$. The frame A is preferably of wood, as far as possible, and the box B is also preferably of wood. When the disks C C′ are set in motion, they act to charge all parts of the casing B by induction, and there is a slow distribution of the charge also by leakage or conduction. The collector-disks I are also charged by induction from the disks C C′ and the casing B.

When the machine is propelled between the cotton-rows, the motor E having been set in operation, the generator-disks C C′ rotate rapidly, and the collector-disks I are charged with electricity of high tension. The collector-disks I are also rotated, but much more slowly, and as they pass by the cotton-plants the ripe cotton, being light and easily detached, is attracted to said collector-disks and carried around thereby in the direction of the arrow. The brushes D D′ are so placed that points of maximum intensity of charge are produced at points on the forward and rear sides. We have found that under these circumstances the cotton which is attracted strongly at the forward side and is carried by the collector around to the rear side is generally dropped or discharged at once at that point. This is due, no doubt, partly to the fact that the cotton, having been charged to some extent on its way around, is repelled by the strong charge of like electricity at the rear side. Another and at least contributory reason is found in the fact that as the hanging cotton passes the vertical over the center it tends to turn over and hang in the other direction, and this turning over tends to dislodge it. With pieces of cotton of any substantial size the discharge is both rapid and certain. The doffing-cylinder M may, however, be used to insure complete discharge of the cotton from the collector, and as it moves at a higher surface speed than the collector and with the side next the collector in a downward direction it brushes the cotton down into the receptacle K.

As the motor E for operating the generator and collector is driven independently of the motion of the carrier-frame A, the generator-disks may be brought up to required speed and maintained at that speed whether the carrier is being propelled or not. This is an important advantage. In some cases, however, it may be considered preferable to drive all the parts by connection from the truck-wheels. In such a case a truck adapted to be propelled by horse-power may be used, such as shown in Figs. 3 and 4, wherein A′ is the frame of a two-wheel truck or carrier supporting the casing B, with generator C C′ inclosed thereby, and collectors I, the said casing, generator, and collector being similar to those described in connection with Figs. 1 and 2. In this case, however, the power to drive the collectors and generator is obtained from one of the main truck-wheels $a^3$, which carries a gear N, engaging with a pinion $n$ on a shaft $n'$. Also fastened to this shaft $n'$ is a sprocket-wheel $n''$, connected by chain O to sprocket-wheel $p$ on counter-shaft P. On this counter-shaft P is an arm $p'$, carrying a pawl $p^2$, engaging with a ratchet $q$ on a second counter-shaft Q. This counter-shaft is connected by pulleys $q'$ $q^2$, belts $r$ $r'$, and pulleys $c$ $c'$ to generator-disks C C′. The frame A′ consists of a cross-bar $a^5$, from which depend the brackets $a^6$ $a^7$ $a^8$ $a^9$, in which the truck-axles are journaled. This frame has suitable means (shown at S) for attaching horses thereto and carries a driver's seat T. The casing B in this case depends from the cross-frame $a^5$. Guard-plates or guards V are attached to the frame A′, as shown, to force and hold the tops of the cotton-plants toward the collectors. The collectors are driven by frictional engagement with roller or friction-disk $u$ on shaft Q′, driven by belts $u'$ $u^2$ and pulleys $u^3$ $u^4$ from shaft Q. The operation of this modified form of the machine is similar to that above described for the hand-propelled machine, except that the driving of the parts is effected from the truck-wheels, and therefore in general requiring that the truck should be in motion a short time before the generator can be made to give the requisite charge. The machine having been once started, however, the pawl-and-ratchet connection between counter-shafts P Q allows the motion of the generator-disks C C' to continue for a short time after the truck is brought to rest, so that a momentary stop does not affect the charge.

Having thus described our invention, the following is what we claim as new therein and desire to secure by Letters Patent:

1. In a cotton-picking machine, the combination of a supporting-frame, a generator of electricity having movement relatively to said frame, and a cotton-collecting member having movement relatively to the frame independently of the generator, and located in inductive proximity to said generator, so as to be charged by induction therefrom.

2. In a cotton-picking machine, the combination of means for generating electricity, and a movable collector whose movement is independent of such generating means, said collector being located in inductive relation to said generator so as to be charged therefrom by induction.

3. In a cotton-picking machine, the combination of a rotating generator of electricity, and a rotating collector moving at a different speed from said generator and located in inductive relation thereto so as to be charged therefrom by induction.

4. In a cotton-picking machine, the combination of a generator of electricity inclosed in a closed casing, and a collector outside of said casing and charged by said generator, and means for moving said collector independently of said generator.

5. In a cotton-picking machine, the combination of a generator of electricity inclosed in a closed casing, means for drying the air within said casing, a collector outside of said casing and charged by said generator but movable independently thereof.

6. In a cotton-picking machine, the combination with an electrical generator, a movable collector moving in the field of influence of said electrical generator and charged therefrom by induction, and a receptacle for cotton placed beneath said collector, whereby the cotton which is collected and discharged by the varying electrification of said collector, will be caught by said receptacle.

7. In a cotton-picking machine, the combination with a rotating generator of the influence type, of a rotating collector located in inductive relation to said generator, and means for driving the collector and generator independently, the generator being driven at a higher rate of speed than the collector.

8. In a cotton-picking machine, the combination of two electrified disk collectors rotating in parallel planes and adapted to pick from two rows of cotton at once and an electrical generator located between, and in inductive proximity to both of said disk collectors.

9. In a cotton-picking machine, the combination of a collector-disk, a rotary influence-generator having a rotating disk adjacent to the collector-disks and having two brushes at opposite points.

10. In a cotton-picking machine, the combination with an inclosed electrical generator, of a collector movable independently of said generator and located in inductive relation thereto so as to be charged by induction therefrom.

ARTHUR A. HAMERSCHLAG.
THEODORE H. PRICE.

Witnesses as to A. A. Hamerschlag:
  H. E. KNIGHT,
  M. V. BIDGOOD.

Witnesses as to Theo. H. Price:
  G. E. LINDSAY,
  M. V. BIDGOOD.